United States Patent [19]
Patterson et al.

[11] Patent Number: 5,187,925
[45] Date of Patent: Feb. 23, 1993

[54] MOWER DECK LIFT HANDLE MECHANISM

[75] Inventors: Jon M. Patterson, Wauwatosa; Richard D. Teal, Horicon, both of Wis.; James H. Weitz, Ridgewood, N.J.; Steven C. Wasson, Midland, Mich.

[73] Assignee: Deere & Company, Moline, Ill.

[21] Appl. No.: 715,173

[22] Filed: Jun. 14, 1991

[51] Int. Cl.$^5$ ............................................. A01D 34/74
[52] U.S. Cl. ..................................... 56/17.1; 56/14.9
[58] Field of Search ..................... 56/17.1, 17.2, 214, 56/14.7, 14.9; 248/423, 157; 280/43.21, 43.17

[56] References Cited

U.S. PATENT DOCUMENTS

| | | | |
|---|---|---|---|
| 4,120,136 | 10/1978 | Rose | 56/17.1 |
| 4,577,455 | 3/1986 | Amano et al. | 56/17.1 |
| 4,733,522 | 3/1988 | Johansson | 56/17.4 |
| 4,809,489 | 3/1989 | Johansson | 56/14.7 |
| 4,869,057 | 9/1989 | Siegrist | 56/15.9 |
| 4,882,898 | 11/1989 | Samejima et al. | 56/208 |

OTHER PUBLICATIONS

Parts Catalog published by John Deere Horicon works in Aug. 1990 entitled "STX30 and STX38 Lawn Tractors", pp. 85-2 and 85-3.
Parts Catalog published by John Deere Horicon Works in Oct. 1988 entitled "170, 175, 180 and 185 Lawn Tractors", pp. 85-2 and 85-3.
Parts Catalog published by John Deere Horicon Works in Sep. 1990 entitled "GX70 and GX75 Riders", p. 85-1.
Parts Catalog published by John Deere Horicon Works in Sep. 1990 entitled "LX172, LX176, LX178 and LX186 Lawn Tractors", pp. 85-12 and 85-13.
Parts Catalog published by John Deere Horicon Works in Jan. 1989 entitled "RX63, RX73, RX75, SX75, RX95, SX95 Riding Mowers", pp. 85-1, 85-2, and 80-6.
"Preliminary Feasibility Study" containing information generated and provided by employees of The Dow Chemical Co. and Deere & Co., pp. 1-205 including 4 (four) sub-lettered pages, co-generated prior to 1 Sep. 1989 and confidentially shared between Dow and Deere in the U.S.

Primary Examiner—Terry Lee Melius

[57] ABSTRACT

A mechanism for selectively adjusting the cutting height of a mower deck carried by a vehicle having a frame. A laterally extending lift handle formed of a plastic material is engagable by the hand of the operator, and is pivotally coupled with the vehicle for pivoting motion about a generally horizontal axis as the operator lifts the first end portion. A pair of laterally spaced and generally spherical sockets are formed integral with the lift handle between the lift handle's first and second end portions. Each socket pivotally supports a ball member. Link members are provided having first portions coupled with respective ball members, and second portions pivotally coupled with the mower deck for vertically shifting the deck relative to the vehicle as the lift handle pivots. A four bar linkage is coupled between the vehicle and the deck for maintaining the deck in a generally level position throughout the deck's vertical range of motion.

20 Claims, 3 Drawing Sheets

MOWER DECK LIFT HANDLE MECHANISM

BACKGROUND OF THE INVENTION

1. Field of the Invention

The invention relates to mechanisms for adjusting the cutting height of a mower deck suspended from a driven vehicle.

2. Description of the Related Art

A first type of conventional mower deck height adjustment mechanism provides a lever arm that extends upwardly from the vehicle to be pivoted by one of the operator's hands. The lever is typically rigidly coupled with a laterally extending shaft that pivots about its own axis as the operator shifts the lever. The shaft is coupled with a linkage having a plurality of parts that act to raise and lower the deck as the shaft rotates while maintaining the deck in a generally level or horizontal position. A locking mechanism is provided for securing the lever, shaft or linkage in a particular position to fix the deck's operating height. The locking mechanism can be released by the operator so that the deck's height can again be adjusted.

This first type of height adjustment mechanism is relatively complex and requires the use of an undesirably large number of parts. Bushings or bearings are typically provided for pivotally supporting the shaft and the various pivoting linkage members. These bushings must be capable of withstanding relatively large force loads associated with the weight of the mower deck. Therefore many mowers provide bushings or bearings that are made of relatively high strength materials. These high strength bearings raise the cost of manufacturing and assembling the mechanism.

Many such height adjustment mechanisms must be grasped by one of the operator's hands while he simultaneously releases the locking mechanism with his other hand. Therefore the lifting operation may be difficult for the operator since he can only use one arm to shift the lever.

A second type of conventional mower deck height adjustment mechanism provides a lift arm carried by the vehicle between and beneath the operator's legs such that the operator can grasp and lift the lift arm with both hands while seated on the vehicle. The locking mechanism is often coupled with the lift arm such that the operator can release the locking mechanism while keeping both hands grasping the lift arm. The lifting operation is therefore accomplished more easily by the operator since he can use both hands and arms during lifting.

Many of the second type of lift mechanisms involve the use of a large number of parts and are therefore relatively complex. Also, pivot bushings or bearings made of relatively high strength materials are often utilized to pivotally support the various parts of the mechanism. Therefore these mechanisms are relatively costly to manufacture and assemble.

Mower decks that are carried by powered vehicles can become tilted out of a horizontal plane after periods of rough use. Mechanisms have therefore been provided for adjusting or correcting the attitude of the mower decks so that the deck can be returned to a level position. Leveling adjustment mechanisms often require several tools to be used simultaneously during the leveling operation. Many leveling mechanisms also require the operator to adjust the mechanism at a location beneath the vehicle that is difficult to reach. In addition, when these mechanisms are adjusted, the mower deck is often shifted out of correspondence with the height indicator gauges, such that the indicators no longer indicate the actual height at which the deck is cutting.

Therefore, it would be desirable to provide a mower deck lift mechanism that is simple in construction and requires the use of a relatively small number of parts. It would be desirable for a mechanism to allow adjustment of the mower deck height while maintaining the deck in level or horizontal position, and to allow the operator to lift the deck with both of his hands. It would be desirable to provide a mechanism with a leveling adjustment mechanism that allows the operator to return the deck to a level position. It would also be desirable for the operator to be able to make the leveling adjustment from an easily accessible location, and such that cutting height indicators remain accurate.

SUMMARY OF THE INVENTION

The invention according to the preferred embodiment of the present invention provides a mechanism for selectively adjusting the cutting height of a mower deck carried by a vehicle having a frame. The mechanism includes a laterally extending lift handle formed of a plastic material. The lift handle has a first end portion engagable by the operator's hand, and a second end portion pivotally coupled with the vehicle for pivoting motion about a generally horizontal axis as the operator lifts the first end portion. A pair of laterally spaced and generally spherical sockets are formed integral with the lift handle between the lift handle's first and second end portions. Each socket pivotally supports a ball member. Link members are provided having first portions coupled with respective ball members, and second portions pivotally coupled with the mower deck for vertically shifting the deck relative to the vehicle as the lift handle pivots. The preferred embodiment also provides a four bar linkage coupled between the vehicle and the deck for maintaining the deck in a generally level position throughout the deck's vertical range of motion.

DESCRIPTION OF THE PREFERRED EMBODIMENT

Figure 1:
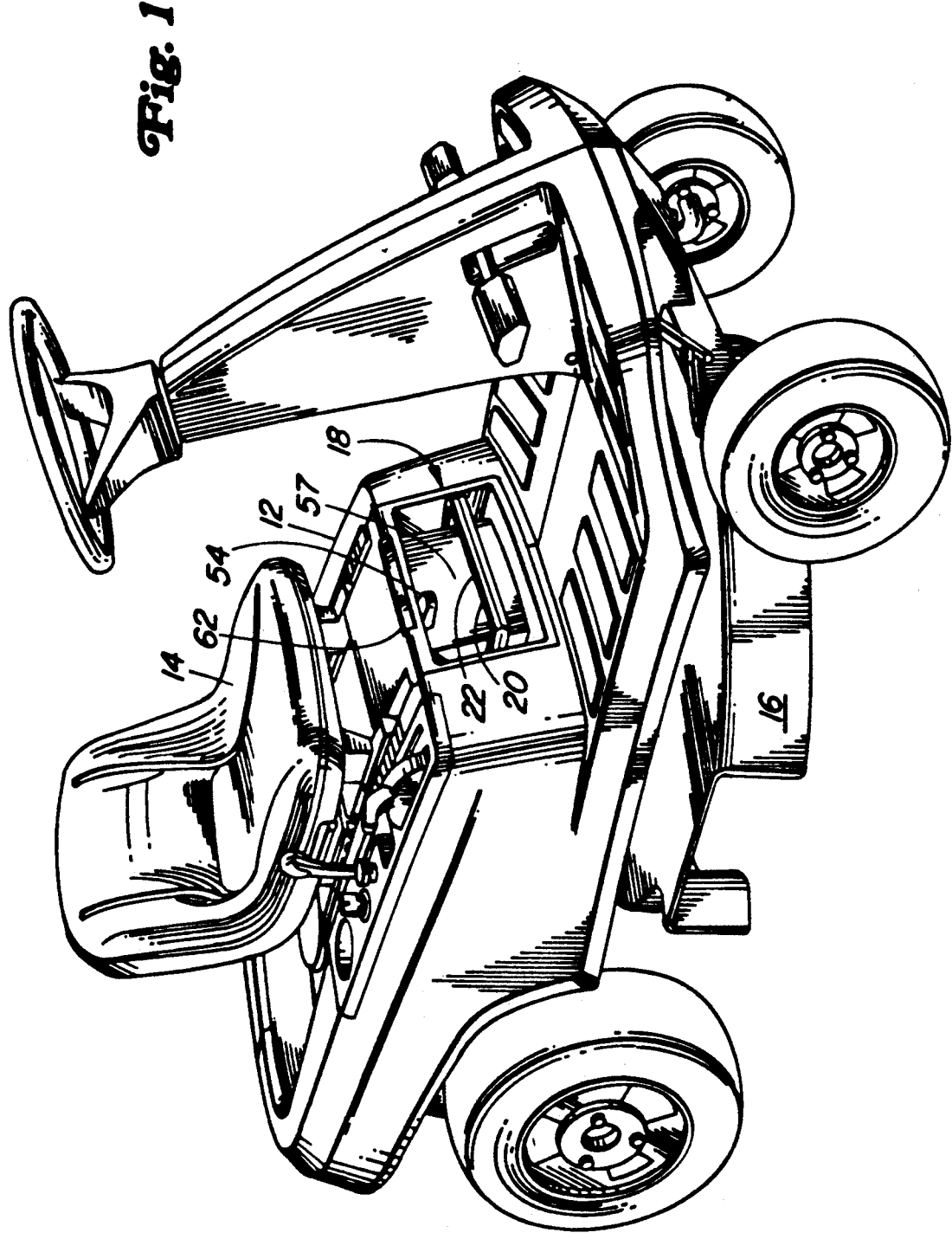
FIG. 1 shows a vehicle with which the present invention may be used.
Figure 2:
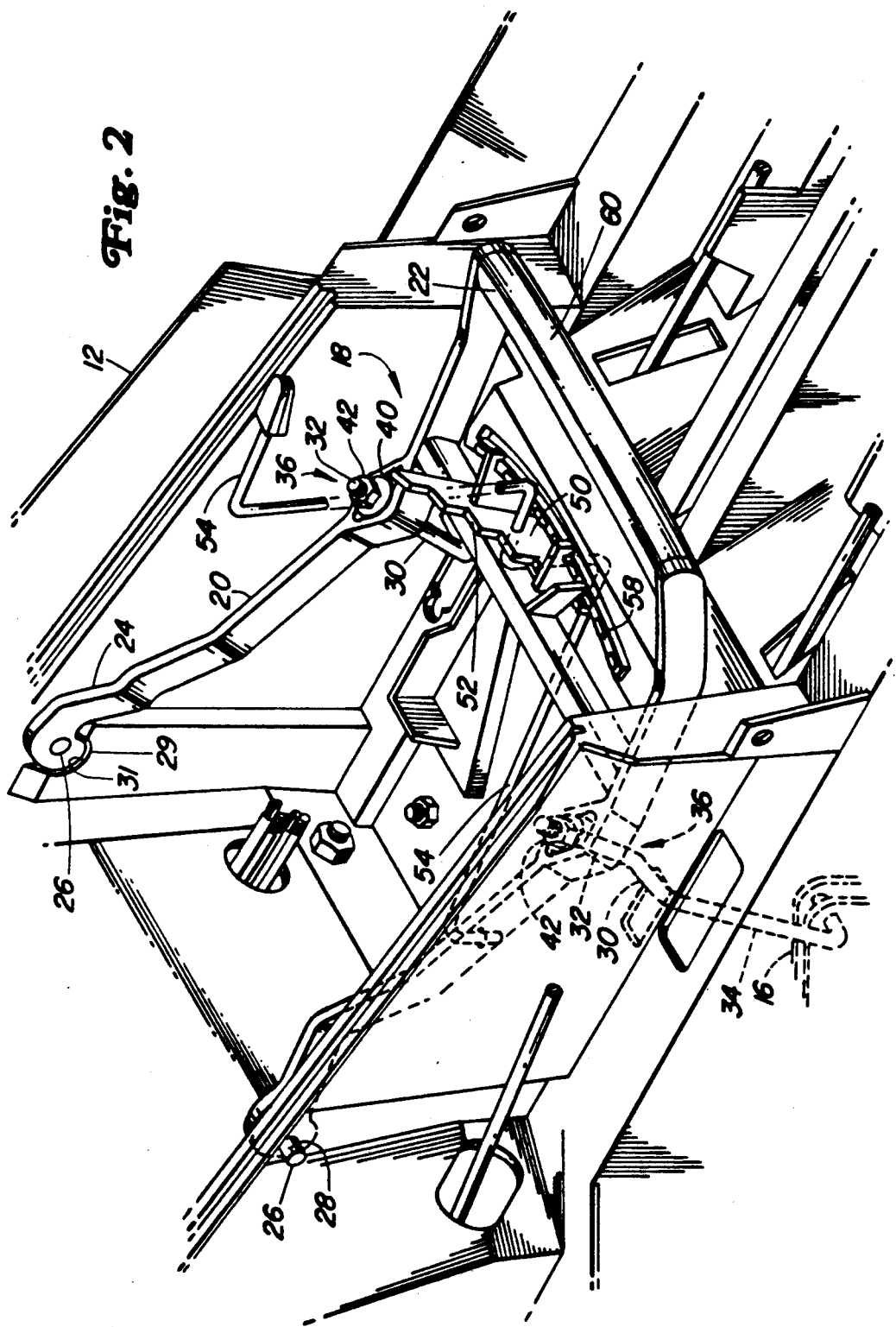
FIG. 2 is a perspective view of the vehicle with the seat/and compartment cover removed to show the lift mechanism within the compartment.
Figure 3:
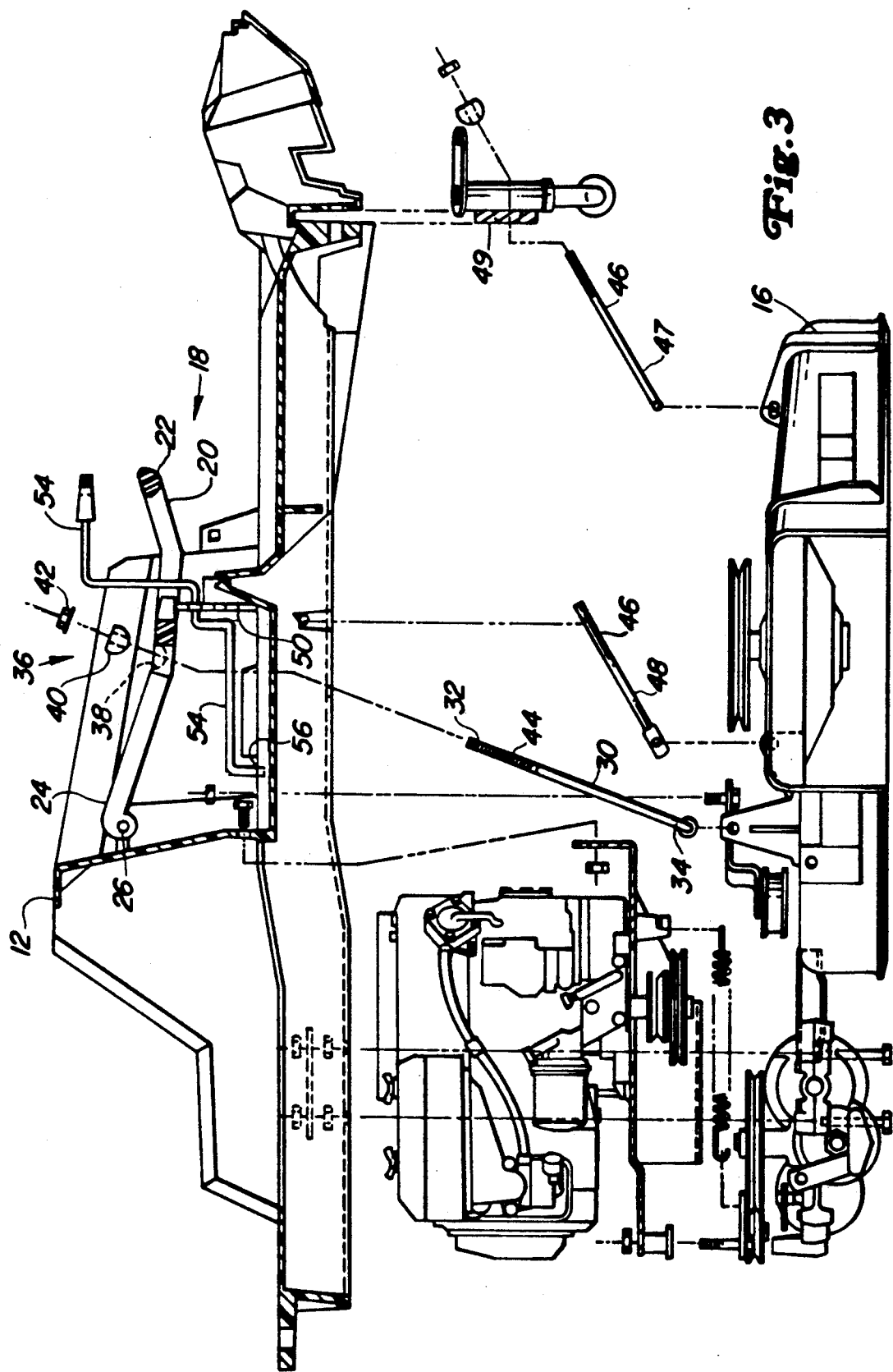
FIG. 3 is an exploded view of the lift mechanism according to the preferred embodiment.

Referring now to FIG. 1, there is shown a powered vehicle 10 with which the preferred embodiment of the present invention may be used. The vehicle 10 includes a frame 12, an operator seat 14, and a mower deck 16 for cutting vegetation.

A lift mechanism 18 is provided for adjusting the cutting height of the mower deck 16. A lift handle 20 formed of a plastic material is carried beneath the seat 14 and has a first end portion 22 for engagement with the operator's hand and a second end portion 24 pivotally coupled with the vehicle 10. The second end portions 24 provide peg members 26 formed integral with the lift handle 20. The peg members 26 are pivotally received by openings 28 formed in the vehicle frame 12. The peg members 26 define the axis about which the lift handle 20 pivots and may support a portion of the weight of the lift handle 20. A rounded portion 29 formed integral with the second end portion 24 of the lift handle 20 is rotatably received by a rounded ledge portion 31 formed by the vehicle frame 12. The rounded portion 29 of the lift handle 20 transfers a portion of the weight of the lift handle 20 to the vehicle frame 12. A pair of laterally spaced link members or rod means 30 include first end portions 32 pivotally coupled with the lift handle 20, and second end portions 34 pivotally coupled with the deck 16. The rod means 30 are coupled to the lift handle 20 between the lift handle's first and second end portions 22 and 24 via ball and socket mechanisms 36. Generally spherical sockets or seat means 38 are formed in the lift handle 20 and pivotally receive mating universal motion means or ball members 40. Lock nuts or nuts 42 engaged with threads 44 formed in the first end portions 32 of the rods 30 act to support the rods 30 vertically within the balls 40. The rods 30 and deck 16 are thereby coupled with the lift handle 20 for shifting vertically as the operator raises or lowers the lift handle 20. The preferred embodiment of the present invention also provides a four bar linkage 46 coupled between the vehicle frame 12 and the deck 16 for maintaining the deck 16 in a generally horizontal position throughout the deck's vertical range of motion. The four bar linkage 46 includes front and rear pairs of rods 47 and 48 each pivotally coupled between the mower deck 16 and the vehicle 10. The front pair of rods 48 couple the front portion of the deck 16 with a pivotal front axle 49 such that the deck 16 will tilt to follow the contours of the ground.

The preferred embodiment of the present invention also provides a mechanism carried in a compartment beneath the seat 14 for securing the deck 16 at a plurality of particular vertical cutting positions. A support member 50 is slidably carried by the vehicle frame 12 for lateral shifting upon engagement by the operator. The support member 50 includes a plurality of laterally spaced and vertically offset step means 52 engagable with the lift handle 20 for supporting the lift handle 20 at a variety of heights corresponding to respective lateral positions of the support member 50. A pivot member or pivot rod 54 is rigidly coupled with the support member 50 and is pivotally received by a hole 56 formed in the vehicle frame 12. The pivot rod 54 swings laterally about the hole 56 and guides the support member 50 through a laterally extending arc. The pivot rod 54 extends forwardly from the support member 50 and through a compartment door or cover 57 positioned between the seated operator's legs. The operator can selectively shift the pivot rod 54 laterally to secure the deck 16 at a different cutting height. A plurality of indexing means 58 are provided corresponding to respective step means 52. The indexing means 58 are formed integral with the frame 12 and are engagable with the support member 50 for blocking the support member 50 from shifting laterally when the lift handle 20 is not being lifted by the operator.

Next, the operation of the preferred embodiment will be discussed. To adjust the cutting height of the mower deck 16, the operator grasps the lift handle 20 with both hands while remaining seated on the vehicle seat 14. He lifts the lift handle 20, thereby pivoting the lift handle 20 upwardly about its pivotal connection with the frame 12. When the operator lifts the lift handle 20, the pivot rod 54 and support member 50 can be shifted laterally across the indexing means 58 to a new position. The operator can move the pivot rod 54 with his thumbs as he grasps the lift handle 20 with both hands. The operator thereby re-positions the pivot rod 54 into alignment with the desired cutting height shown on a cutting height indicator 62 printed on the cover 57. Each numeral represents a cutting height associated with a respective step 52 formed in the support member 50, such that the operator knows where to position the pivot rod 54 to achieve a particular cutting height. When the pivot rod 54 has been shifted to the desired position, the lift handle 20 can be lowered such that the lift handle 20 comes to rest on the step means 52 corresponding to the desired cutting height.

As the lift handle 20 is raised or lowered to a new position, the ball members 40 pivot within the sockets 38 to allow the rods 30 to pivot relative to the lift handle 20. The vertical motion of the pivoting lift handle 20 is transferred to the deck 16 by the rods 30. The balls 40 act to distribute the weight of the deck 16 across a relatively large area within the socket 38 regardless of the angle at which the rod 30 is positioned. The ball and socket coupling 36 therefore provides efficient transferal of loads even if the mower deck 16 shifts laterally when the vehicle 10 is operating on a side slope. Since the ball members 40 act to distribute the weight of the deck 16 across a relatively large area within the socket 38, the lift arm 20 and ball member 40 can be formed of relatively weak material. The material costs of the height adjustment mechanism 18 can thereby be reduced. Accordingly, the preferred embodiment provides a lift arm 20 and socket 38 formed therein made of plastic material, and the ball members 40 are made of a powdered metal material. The lift handle could also be formed of a metal material according to the present invention. The sockets 38 according to the preferred embodiment can be formed integral with the plastic lift handle 20 when the lift handle 20 is molded. The cost of the mechanism is thereby reduced since a separate socket or pivot mechanism such as a lubricated bearing is not required to be attached to the lift handle 20. Similarly, the peg members 26, rounded portions 29 and grip 60 are formed integral with the lift handle 20, and therefore the number of parts and the cost to assemble the mechanism is further reduced.

After long periods of operation and wear, the mower deck 16 may become tilted to one side or the other. Such tilting may occur, for example, as a result of the rods 48 becoming bent after operation over extremely rough terrain. Once the deck 16 becomes tilted or non-level, the blade will rotate in a plane other than the horizontal plane such that vegetation will be cut in a non-level fashion. The preferred embodiment of the present invention provides a mechanism that allows the operator to return the deck 16 to its level position such that vegetation will be cut evenly and horizontally. To adjust the angle of the deck 16, the operator rotates one of the nuts 42 that is threaded on one of the rods 30. The adjustment of the nut 42 will cause the respective rod 30 to be raised or lowered within the ball member 40, and the portion of the deck 16 coupled to the respective rod 30 will shift vertically. Therefore, the adjustment of one of the nuts 42 will raise or lower the respective side of the deck 16 such that the deck 16 will return to a level position.

Adjustment mechanisms are provided on each side of the deck 16 to allow the deck 16 to be adjusted to a level position such that the height of the deck 16 will accurately correspond to the reading on the deck height indicator 62. For example, if the right side of the deck 16 becomes raised up out of its level position as a result of long periods of rough operation, the nut 42 on the right side can be adjusted to lower the rod 30 on the right side. The right side of the deck 16 will therefore return to its correct position such that the height reading shown on the deck height indicator 62 will be accurate. If merely a single leveling device were provided on the left side only, then the left side of the deck would have to be raised to the level of the right side of the deck. The deck 16 would then be level, but slightly higher than indicated by the reading shown on the deck height indicator 62, thereby making the indicator 62 inaccurate. The preferred embodiment of the present invention allows the operator to level the deck 16, and also to return the deck 16 to its original elevation such that the deck height indicator 62 remains accurate.

To adjust a particular nut 42, the operator removes the compartment cover and reaches into the compartment formed by the frame 12 beneath the seat 14. The nuts 42 are accessible within the compartment, thereby eliminating the need to reach beneath the vehicle 10 to level the deck 16.

The preferred embodiment of the present invention includes a four bar linkage means 46 that maintains the deck 16 in a level or horizontal position as it shifts through its vertical range of motion. As the lift handle 20 pivots, the rods 30 thereattached shift the deck 16 vertically. The four bar linkage rods 47 and 48 pivot about their couplings with the vehicle 10. The four bar linkage 46 therefore keeps the deck 16 aligned horizontally to maximize the quality of cut regardless of the cutting height chosen.

The present invention allows the deck 16 to ride up and over irregular ground conditions and undulations in ground contour. The front rods 47 of the four bar linkage 46 couple the front portion of the deck 16 with the pivotal front axle 49. Therefore, as the front axle 49 pivots as side slopes or other ground undulations are encountered, the front portion of the deck 16 will tilt or pivot with the front axle 49. To accommodate the tilting of the deck 16, a respective rod 30 received by ball member 40 will shift upwardly within the ball member 40. Once the vehicle 10 returns to level ground the respective rod 30 will fall back downwardly within the ball member 40 until the nut 42 contacts the ball member 40. The deck 16 thereby returns to a level position beneath the vehicle 10.

I claim:

1. A mechanism for selectively adjusting the cutting height of a mower deck carried by a vehicle having a frame, said mechanism comprising:
   a lift handle having a first end portion engagable by the operator's hand and a second end portion pivotally coupled with the vehicle for pivoting motion about a generally horizontal axis as the operator lifts the first end portion;
   seat means formed integral with the lift handle between the lift handle's first and second end portions and adapted for supporting a universal motion means;
   universal motion means resting within and supported by the seat means; and
   a link member having a first portion coupled with the universal motion means, said link member having a second portion pivotally coupled with the mower deck for vertically shifting the deck relative to the vehicle as the lift handle pivots.

2. The invention of claim 1, wherein the seat means is a generally spherical socket and the universal motion means is a ball member pivotally supported by the socket.

3. The invention of claim 1 wherein the lift handle is formed of a plastic material.

4. The invention of claim 1, further comprising a grip formed integral with the first end portion of the lift handle for engagement with the hand of the operator.

5. The invention of claim 1, and further comprising peg members formed integral with the lift handle and received by openings formed in the frame, said peg members defining the axis about which the lift handle pivots.

6. The invention of claim 2, wherein the link member further comprises a rod received by a hole formed in the ball member and pivotally coupled with the deck for shifting the deck vertically as the lift handle pivots.

7. The invention of claim 6, and further comprising:
   threads formed in the rod means; and
   a nut adjustably carried by the threads of the rod means and in abutment with the ball member to support the rod vertically within the hole, said nut being adjustable to selectively vary the vertical position of the portion of the deck coupled with the rod means.

8. The invention of claim 7, wherein the rod is shiftable upwardly within the ball member to accommodate upward shifting of the deck, said nut being carried by the rod to abut the ball member when the rod shifts downwardly within the ball member.

9. The invention of claim 8, wherein the nut is a lock nut.

10. The invention of claim 7, and further comprising:
    a seat carried by the vehicle and upon which the operator may sit during vehicle operation; and
    a compartment formed by the vehicle frame beneath the seat and within which the nut is accessible by the operator for adjustment.

11. The invention of claim 1, and further comprising a four bar linkage means coupled between the vehicle and the deck for guiding the deck vertically and maintaining the deck in level position throughout the deck's vertical range of motion.

12. A mechanism for selectively adjusting the cutting height of a mower deck carried by a vehicle having a frame, said mechanism comprising:
    a lift handle having a first end portion engagable by the operator's hand and a second end portion pivotally coupled with the vehicle for pivoting motion about a generally horizontal and laterally extending axis as the operator lifts the first end portion, said lift handle also extending laterally with respect to the vehicle;
    at least two laterally spaced and generally spherical sockets formed integral with the lift handle between the lift handle's first and second end portions;
    ball members pivotally supported by respective sockets; and
    link members each having a first portion coupled with the respective ball members, said link members each having a second portion pivotally coupled with the mower deck for vertically shifting the deck relative to the vehicle as the lift handle pivots.

13. The invention of claim 12, wherein the lift handle is a plastic material.

14. The invention of claim 12, further comprising a laterally extending grip formed integral with the first end portion of the lift handle and engagable by both of the operator's hands.

15. The invention of claim 14, and further comprising peg members formed integral with the lift handle and received by openings formed in the frame, said peg members defining the axis about which the lift handle pivots.

16. The invention of claim 12, wherein the link members each further comprise:
   a rod received by a hole defined in the ball member; and
   a nut threaded onto the rod and in abutment with the ball member for vertically supporting the rod within the hole in the ball member, said nut being adjustable to selectively vary the vertical position of the portion of the deck coupled with the rod means.

17. The invention of claim 16, and further comprising:
   a seat carried by the vehicle and upon which the operator may sit during vehicle operation; and
   a compartment formed by the vehicle frame beneath the seat and within which the nuts are accessibly by the operator for adjustment.

18. The invention of claim 12, and further comprising a four bar linkage means coupled between the vehicle and the deck for guiding the deck vertically and maintaining the deck in level position throughout the deck's vertical range of motion.

19. A mechanism for selectively adjusting the cutting height of a mower deck carried by a vehicle having a frame, said mechanism comprising:
   a lift handle formed of a plastic material and having a first end portion engagable by the operator's hand and a second end portion pivotally coupled with the vehicle for pivoting motion about a generally horizontal and laterally extending axis as the operator lifts the first end portion;
   a grip formed integral with the first end portion of the lift handle for engagement with the hand of the operator;
   peg members formed integral with the lift handle and received by openings formed in the frame, said peg members defining the axis about which the lift handle pivots,
   a generally spherical socket formed integral with the lift handle between the lift handle's first and second end portions;
   a ball member pivotally supported by the socket;
   a link member having a first portion received by a hole formed in the ball member, said link member having a second portion pivotally coupled with the mower deck for vertically shifting the deck relative to the vehicle as the lift handle pivots.
   threads formed in the link member; and
   a nut adjustably carried by the threads of the link member and in abutment with the ball member to support the link member vertically within the hole, said nut being adjustable to selectively vary the vertical position of the portion of the deck coupled with the link member.

20. The invention of claim 19, and further comprising:
   a seat carried by the vehicle and upon which the operator may sit during vehicle operation; and
   a compartment formed by the frame of the vehicle beneath the seat and within which the nuts are accessible by the operator for adjustment.

* * * * *

UNITED STATES PATENT AND TRADEMARK OFFICE
CERTIFICATE OF CORRECTION

PATENT NO. : 5,187,925

DATED : 23 February 1993

INVENTOR(S) : Jon Michael Patterson et al.

It is certified that error appears in the above-identified patent and that said Letters Patent is hereby corrected as shown below:

Column 7, line 25, delete "accessibly" and insert therefor --accessible--.

Column 8, line 20, delete "." and insert therefor --;--.

Signed and Sealed this

Twenty-eighth Day of December, 1993

Attest:

BRUCE LEHMAN

Attesting Officer     Commissioner of Patents and Trademarks